United States Patent [19]
Yamazaki et al.

[11] Patent Number: 5,619,353
[45] Date of Patent: Apr. 8, 1997

[54] ELECTRO-OPTICAL DEVICE

[75] Inventors: Shunpei Yamazaki, Tokyo; Toshimitsu Konuma, Kanagawa; Takeshi Nishi, Kanagawa; Michio Shimizu, Kanagawa, all of Japan

[73] Assignee: Semiconductor Energy Laboratory Co., Ltd., Kanagawa-ken, Japan

[21] Appl. No.: 345,342

[22] Filed: Nov. 21, 1994

Related U.S. Application Data

[63] Continuation of Ser. No. 895,708, Jun. 9, 1992, abandoned.

[30] Foreign Application Priority Data

Jun. 10, 1991  [JP]  Japan .................. 3-165065

[51] Int. Cl.$^6$ .......................................... G02F 1/13
[52] U.S. Cl. ...................... 349/89; 349/169; 349/182
[58] Field of Search ...................... 359/51, 52, 99, 359/103, 91; 428/1

[56] References Cited

U.S. PATENT DOCUMENTS

| | | | |
|---|---|---|---|
| 3,697,297 | 10/1972 | Churchill et al. | 359/52 |
| 3,872,050 | 3/1975 | Benton et al. | 359/51 X |
| 3,935,337 | 1/1976 | Taylor | 359/76 |
| 4,101,207 | 7/1978 | Taylor | 359/81 |
| 4,435,047 | 3/1984 | Fergason et al. | 359/52 |
| 4,643,528 | 2/1987 | Bell, Jr. | 359/52 |
| 4,671,618 | 6/1987 | Wu et al. | 359/94 X |
| 4,688,900 | 8/1987 | Doane et al. | 359/52 |
| 4,856,876 | 8/1989 | Fegason | 359/52 |
| 4,950,052 | 8/1990 | Fergason et al. | 359/93 |
| 4,992,201 | 2/1991 | Pearlman | 252/299.1 |
| 5,056,898 | 10/1991 | Ma et al. | 359/94 |
| 5,093,735 | 3/1992 | Doane et al. | 359/52 |
| 5,128,785 | 7/1992 | Yoshimoto et al. | 359/58 |
| 5,145,546 | 9/1992 | Yuasa et al. | 156/324 |
| 5,200,108 | 5/1993 | Yuasa et al. | 252/299.01 |
| 5,259,987 | 11/1993 | McArdle et al. | 252/299.01 |
| 5,269,963 | 12/1993 | Uchida et al. | 252/299.01 |
| 5,285,298 | 2/1994 | Kaneko et al. | 359/43 |
| 5,354,498 | 10/1994 | Akashi et al. | 252/299.01 |

FOREIGN PATENT DOCUMENTS 1142713  6/1989  Japan .

*Primary Examiner*—William L. Sikes
*Assistant Examiner*—James A. Dudek
*Attorney, Agent, or Firm*—Sixbey Friedman Leedom & Ferguson; Gerald J. Ferguson, Jr.; Evan R. Smith

[57] ABSTRACT

An electro-optical liquid crystal device comprises a pair of glass substrates, a liquid crystal layer disposed between the substrates, a transparent electrode arrangement formed on inside surfaces of the substrates in order to apply an electric field to the liquid crystal layer to modulate the optical characteristics of the liquid crystal layer. The liquid crystal layer consists of a number of liquid crystal capsules dispersed in a carrier which includes a dielectric material having a high dielectric constant. The dielectric constant of the liquid crystal layer is adjusted by selecting the amount of the dielectric material contained in the liquid crystal layer.

27 Claims, 4 Drawing Sheets

5,619,353

ELECTRO-OPTICAL DEVICE

This application is a Continuation of Ser. No. 07/895,708, filed Jun. 9, 1992, now abandoned.

BACKGROUND OF THE INVENTION

1. Field of the Invention

The present invention relates to an electro-optical device in general. More particularly, it relates to such a liquid crystal display which can display clear and bright images at desired grades.

2. Description of the Prior Art

Liquid crystal materials can have anisotropy in permittivity, i.e. have different dielectric constants in the axial direction and directions perpendicular thereto. Because of this, the alignment of liquid crystal molecules can be controlled by applying an external electric field in order to influence the transmission of light incident thereon, e.g. for use in optical displays. Known examples of liquid crystals utilized include TN (twisted nematic) liquid crystal materials, STN (super-twisted nematic) liquid crystal materials, ferroelectric liquid crystal materials, polymer liquid crystal materials, dispersion type liquid crystal materials and so forth. It takes a certain time for such liquid crystal materials to respond to application of an external electric field. The responsive times, depending on the materials, are for example several tens of milliseconds in the case of TN liquid crystal materials, several hundreds of milliseconds in the case of STN liquid crystal materials, several hundreds of microseconds in the case of ferroelectric liquid crystal materials, several tens of milliseconds in the case of dispersion-type and polymer liquid crystal materials.

In order to construct visual images, a pair of polarizing plates have to be provided for display panels utilizing TN, STN or ferroelectric liquid crystal materials which are driven on the basis of birefringence. The maximum transmission of light through the panels is usually up to 20% to 30%. On the other hand, in the case of dispersion type liquid crystal materials, liquid crystal molecules having anisotropy in refractive index are confined within carrier in the form of capsules and arranged along the walls of the capsules. The liquid crystal molecules macroscopically appears to be arranged at random and cloudy in the capsules. Incident light in this case is scattered thereon. If an external electric field is applied to the dispersion type liquid crystal, the liquid crystal molecules are aligned in parallel to the electric field so that incident light can pass through the liquid crystal material without scattering. Such a liquid crystal panel requires no polarizing plate and therefore the maximum transmission reaches as high as 80% to 90%. In this case, however, switching elements such as non-linear devices or TFTs are needed to drive the panel because response of the liquid crystal itself to the applied electric field is not so good.

A usual existing active matrix type liquid crystal display is provided with active elements of amorphous or polycrystal thin film transistors of only one of p-channel or n-channel type. In general, an n-channel transistor (called NTFT for short) is connected to each pixel in series. The NTFT is located at an intersection of orthogonal signal lines in a matrix configuration of pixels and activated to transmit a signal to the pixel when control signals are given from the orthogonal directions.

It is, however, difficult to grade picture elements in hue and brightness in such an active matrix system. Conventionally, grading is considered to be realized by adjusting the strength of the electric field applied to respective pixels. Namely, an appropriate voltage is applied across a pixel from a peripheral circuit and transmitted to the pixel of the liquid crystal through a TFT given a gate signal.

Because of dispersion of characteristics of the TFTs and the matrix circuit, however, the voltage actually applied to the pixel tends to fluctuate at least several % or typically several tens %. On the other hand, voltage dependence of transparency of the liquid crystal is highly non-linear so that the transparency may significantly vary near a certain voltage level and even several % fluctuation can result in a rapid change of the transparency. Accordingly, it is impossible to realize grading beyond 16 grades.

In order to solve such a problem, the liquid crystal material is selected to have ability of sufficiently sustaining a voltage applied thereacross. The voltage, however, is gradually reduced because of a possible low resistance of the liquid crystal material or spontaneous discharge resulting in loss in charge accumulated across the liquid crystal material. It has been proposed, as illustrated in FIG. 1, to provide a capacitance 2 in parallel with each pixel 4 in order to compensate the loss by charge accumulated in the capacitance. The aperture ratio, i.e. the ratio of the effective displaying area of the liquid crystal to the entire area, is decreased.

BRIEF SUMMARY OF THE INVENTION

It is an object of the present invention to provide an electro-optical device capable of displaying clear images without providing particular capacitances for sustaining voltages across the liquid crystal layer.

It is another object of the present invention to provide an electro-optical liquid crystal device having a high aperture ratio.

It is a further object of the present invention to provide an electro-optical liquid crystal device which can be manufactured by a simple process and enable a high yield.

It is a still further object of the present invention to provide an electro-optical liquid crystal device capable of displaying bright images at high contrast ratios.

It is a still further object of the present invention to provide an electro-optical liquid crystal device capable of displaying images at desired grades in hue and brightness.

Additional objects, advantages and novel features of the present invention will be set forth in the description which follows, and in part will become apparent to those skilled in the art upon examination of the following or may be learned by practice of the present invention. The object and advantages of the invention may be realized and attained by means of the instrumentalities and combinations particularly pointed out in the appended claims.

To achieve the foregoing and other object, and in accordance with the present invention, as embodied and broadly described herein, an electro-optical device comprises a pair of substrates, an electro-optical modulating layer disposed between the substrates and consisting of a number of particles of a liquid crystal material dispersed in a carrier which includes a dielectric material having a high dielectric constant and an electrode arrangement formed on inside surfaces of the substrates in order to apply an electric field to said electro-optical modulating layer. The dielectric constant of the electro-optical modulating layer is adjusted by selecting the amount of the dielectric material contained in the electro-optical modulating layer.

The characterizing feature of the present invention resides in that the dielectric constant of an electro-optical modulating layer can be controlled in the case of a dispersion type liquid crystal device driven by TFTs. Namely, when such a liquid crystal device is designed with TFTs for driving pixels, the voltage sustaining ability can be maintained without providing particular capacitance so that the aperture ratio is significantly improved.

Materials having high dielectric constants employed for the devices in accordance with the present invention include existing liquid crystal materials having high dielectric constants such as ferroelectric liquid crystal materials. In this case, suitable alignment treatment such as application of an electric field is given to the liquid crystal material.

Hereinbelow, preparation of liquid crystal capsules will be explained. The procedure is based on the existing encapsulation procedure.

First, a liquid crystal material is dispersed in a carrier of a hydrophilic polymer solution to provide a suspension of liquid crystal particles. The diameter of the particles is 1 to 5 micrometers. In this situation, the polymer is attached to the surface of the liquid crystal particles to carry out encapsulation, which process is called coacervation in this case. The polymer is for example zeratine or arabic rubber. By this process, liquid crystal capsules of 3 to 7 micrometer average diameter are formed. When dispersion of the diameter is significant, only capsules having diameter near the average can be sifted out.

Since liquid crystal materials are provided in the form of particles, several procedures such as printing which can not be available in prior art techniques for liquid crystal device manufacture can be used to form a liquid crystal layer (an electro-optical modulating layer) in this case.

The dielectric constant of the liquid crystal layer can be controlled by utilizing materials having dielectric constants no lower than 5 to form the liquid crystal layer together with liquid crystal particles. The example of such highly dielectric materials include polyvinylidenefluoride, polytetrafluoroethylene and a copolymer of vinylidenefluoride and trifluoroethylene. The dielectric constant of the liquid crystal layer can be varied from 1.5 to as high as 20 by appropriately utilizing such highly dielectric materials. Particularly, polyvinylidene and a copolymer of vinylidenefluoride and trifluoroethylene exhibit ferroelectric characteristics and make it possible to maintain charge on the liquid crystal layer even after removal of an electric field applied.

By this procedure, the dielectric constant of the liquid crystal layer can be controlled with the encapsulated liquid crystal. The liquid crystal layer scatters incident light and appears cloudy when no electric field is applied thereto. When an electric field is applied, the liquid crystal molecules contained in the capsules dispersed in the liquid crystal layer are aligned in parallel to the electric field and transmit incident light without scattering. The liquid crystal particles can be controlled independently from the carrier enclosing them in this manner. The voltage sustaining ability of the liquid crystal layer is therefore maintained so that it becomes possible to grade hue and brightness. In this case, no particular capacitance is necessary to be connected in parallel with pixels 4.

The liquid crystal particles are encapsulated in the above explained case. Namely, microcapsules 1 are provided to confine liquid crystal particles 3 as illustrated in FIG. 2(A). The microcapsules are dispersed in a carrier 5. Alternatively, a UV light curable resin or an epoxy resin can be used for carrying liquid crystal particles like an emulsion system instead of encapsulation of a liquid crystal material, as illustrated in FIG. 2(B). The liquid crystal particles 3 are confined directly by a carrier 5 in which the liquid crystal particles are dispersed. In preparation of the system, a resin is mixed with a liquid crystal material in advance of curing the resin and exposed to UV light at an appropriate temperature. As a result, there is formed a system of liquid crystal particles dispersed in the resin. The dielectric constant of the liquid crystal layer is about 2 to 4 in this case. When the resin is a resin comprising fluorine, however, the dielectric constant can be controlled in a broad range as described above.

The voltage sustaining ability of the liquid crystal layer can be maintained at a high level by appropriately adjusting the dielectric constant thereof. There is no need to provide a particular capacitance. Furthermore, since there is little influence of dispersion in the thickness of the liquid crystal layer upon the capacitance of electrodes forming pixels, uniformity of display and the yield are substantially improved.

BRIEF DESCRIPTION OF THE DRAWINGS

The accompanying drawings, which are incorporated in and form a part of the invention and, together with the description, serve to explain the principles of the invention.

DETAILED DESCRIPTION OF THE PREFERRED EMBODIMENTS

Figure 1:
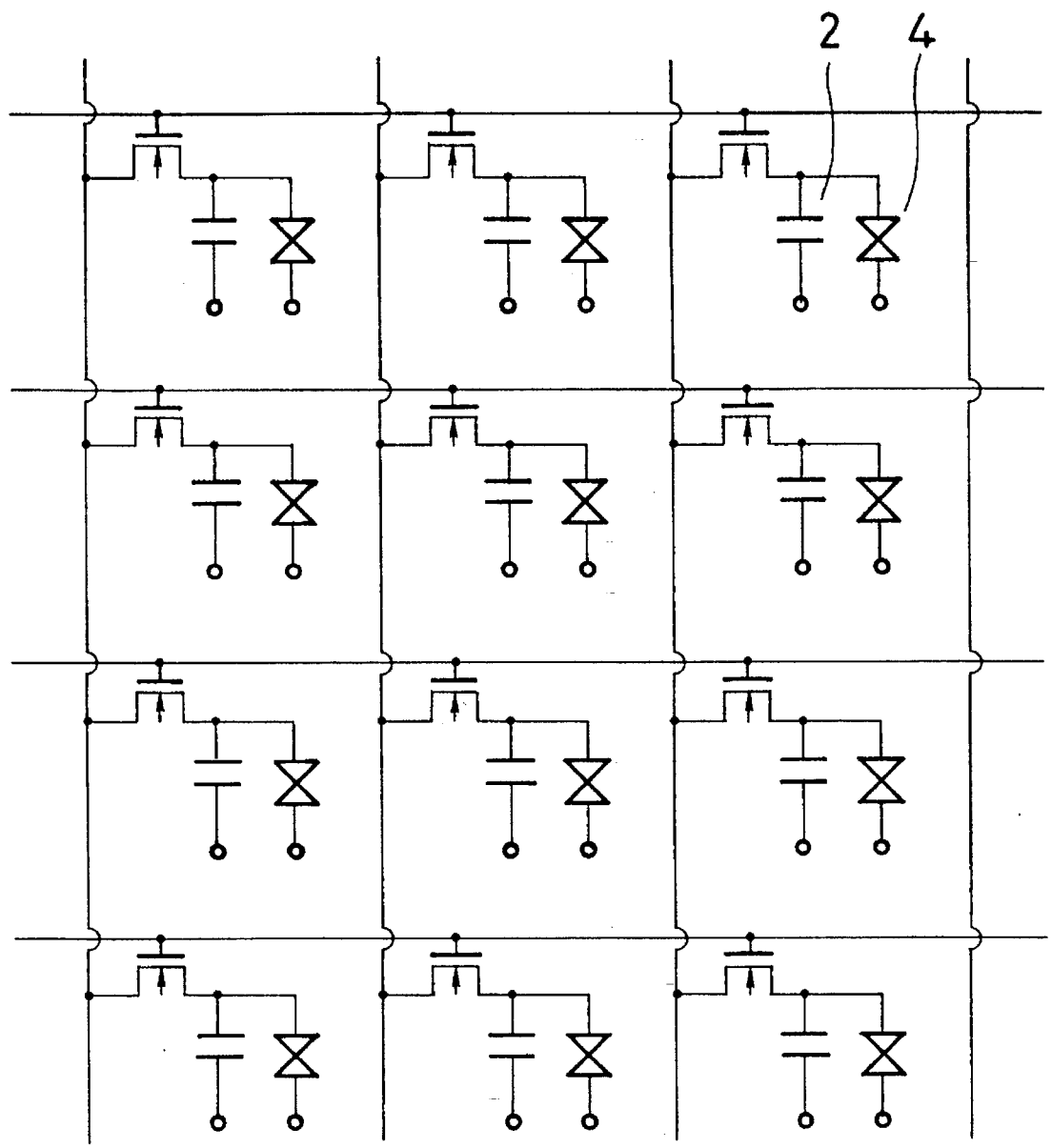
FIG. 1 is an equivalent circuit of a prior art electro-optical liquid crystal device.
Figure 2A:
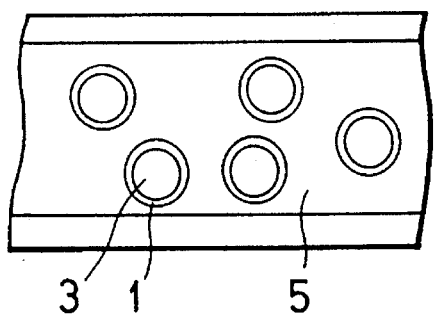
FIGS. 2(A) and 2(B) are schematic diagrams showing liquid crystal particles in accordance with the present invention.
Figure 2B:
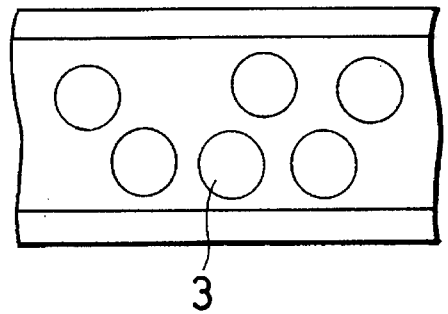
Figure 3:
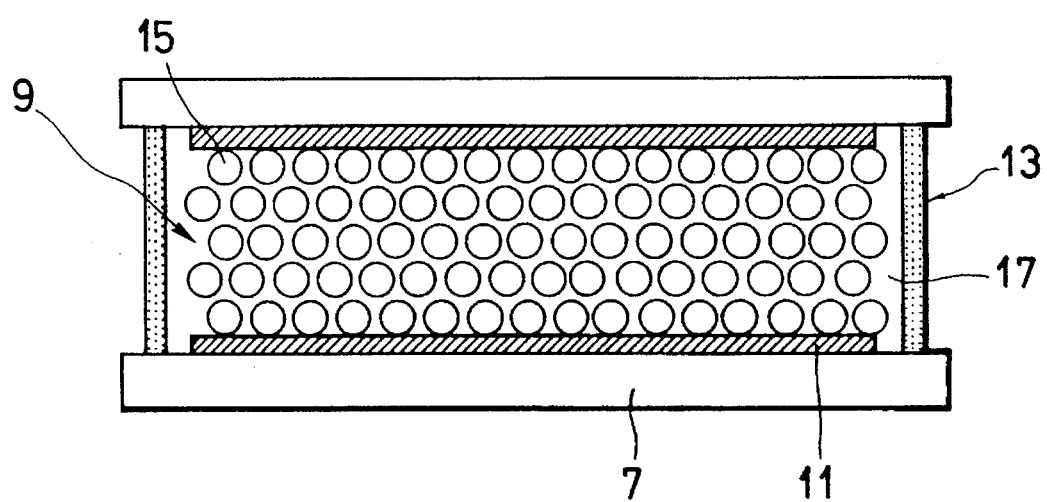
FIG. 3 is a schematic diagram showing an electro-optical liquid crystal device in accordance with the present invention.

Referring now to FIG. 3, an electro-optical liquid crystal device in accordance with the present invention will be explained. The device comprises a pair of glass substrates 7, an electro-optical modulating layer 9 disposed between the substrates 7, a pair of transparent electrode arrangements 11 provided in the opposed inner surfaces of the substrates contiguous to the liquid crystal layer 9 and a sealing member 13. The electro-optical modulating layer 9 is composed of a liquid crystal material in the form of capsules or particles 15 dispersed in a carrier 7.

The carrier 17 is made of a material having high dielectric constants such as fluorine-base resins, e.g. polyvinylidenefluoride, tetrafluoroethylene and high polymers containing fluorine such as copolymer of vinylidenefluoride and trifluoroethylene. The dielectric constant of the electro-optical modulating layer 9 can be controlled by adjusting the amount of the material having a high dielectric constant contained in the electro-optical modulating layer.

In accordance with a preferred embodiment, a liquid crystal material is encapsulated in microcapsules. Microcapsules containing a liquid crystal material are prepared in the following manner. The liquid crystal material is a nematic liquid crystal material distributed as BL001 (Trademark) by Merck Corp. The liquid crystal material has anisotropy of refractive index. The refractive index of the liquid crystal material is 1.521 to ordinary rays. The refractive index of the liquid crystal material is 1.746 to extraordinary rays. The liquid crystal material is dispersed in chloroform in the form of a suspension consisting of fine particles of the liquid crystal material. A 5% to 15% aqueous solution of zeratine and a 5% to 10% aqueous solution of arabian rubber are prepared and mixed with the chloroform suspension to provide an emulsion. The emulsion is then heated at 40° C. and its pH is adjusted by adding distilled water thereto. By this procedure, the external surfaces of the liquid crystal fine particles are coated with zeratine and arabic rubber to form liquid crystal fine capsules. The zeratine and arabic walls are developed by adding an aldehyde or the like and cooled to form microcapsules.

Next, trifluoroethylene polymer is dissolved in an alcohol solution including acetone. The concentration of the polymer is 1 to 15%. The dielectric constant of this polymer is very high, i.e. exhibits ferroelectricity so that the dielectric constant of the liquid crystal layer can be controlled by adjusting the amount of the polymer contained in the liquid crystal layer. The liquid crystal microcapsules are added to the polymer solution at 5% to 30%, printed on a glass substrate coated with a conductive film, and heated at 70° C. in a dry atmosphere. The glass substrate is joined to a counterpart glass substrate on which TFTs are formed from a polycrystalline semiconductor utilizing laser annealing. In accordance with a typical example, suitable conductive pads are formed on the inside surfaces of the substrates in the form of a matrix together with the TFTs in order to form an active matrix configuration consisting of a plurality of pixels. An example of the circuit formed in the substrates sandwiching the liquid crystal layer is as shown in FIG. 4.

Figure 4:
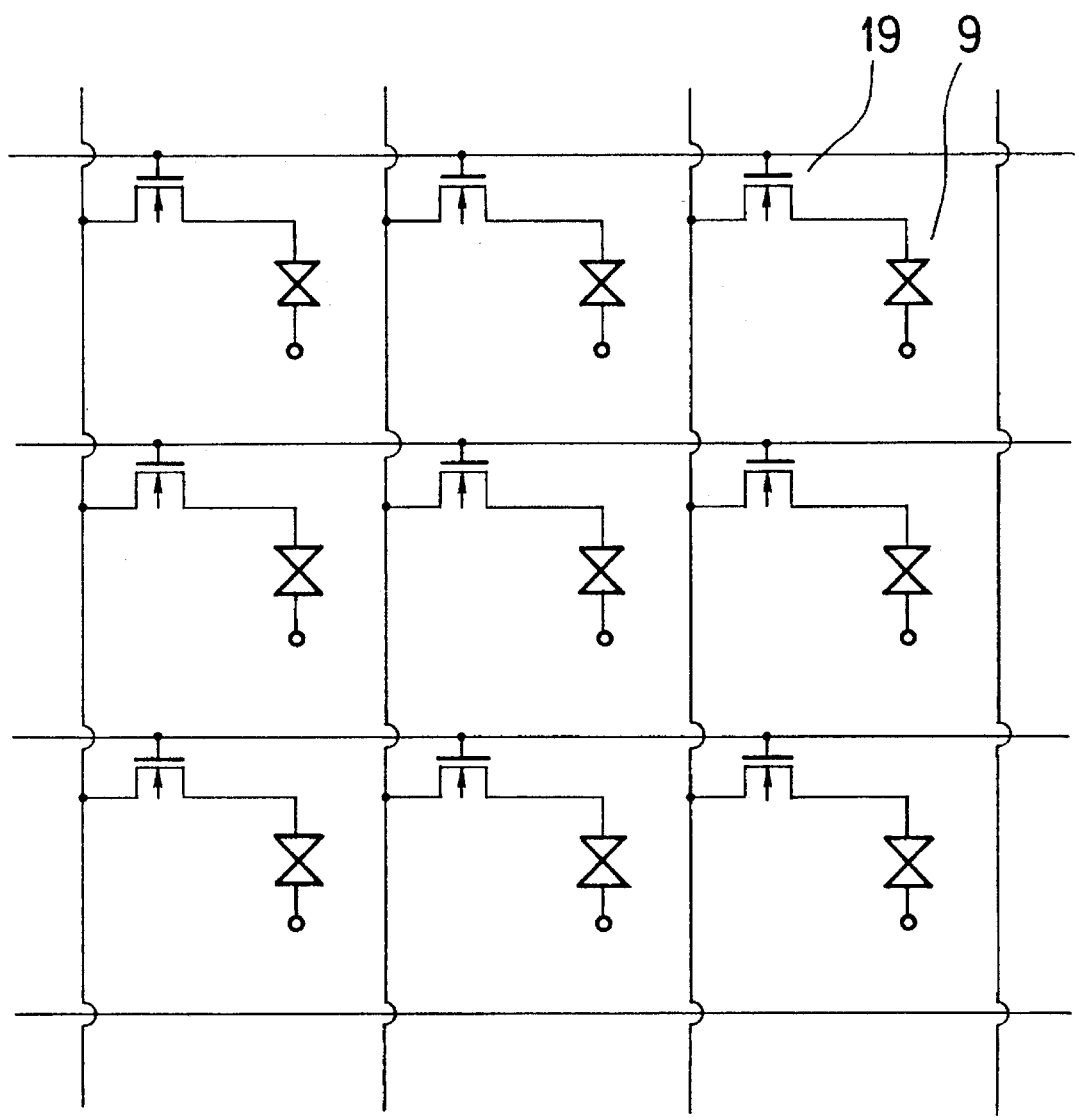
FIG. 4 is an equivalent circuit of an electro-optical liquid crystal device in accordance with the present invention.

In FIG. 4, the liquid crystal layer 9 is selectively subjected to an electric field at selected pixels by applying suitable voltages to the drains and the gates of the TFTs 19. The liquid crystal layer can be optically controlled when a voltage is applied thereto as high as about 6 V. Since the TFTs are formed from polysilicon in this embodiment, high voltage driving is possible. In practice, the threshold voltage of the liquid crystal layer is 5.8 V. The saturated voltage is 12 V. The transparency at these voltages are 3% and 85% respectively. By adjusting the applied voltage between these voltages, the brightness can be changed at 16 grades.

The voltage applied to the liquid crystal layer is maintained at 98% to 99.8% of respective initial voltage levels so that there is no need to provide capacitances in parallel with the respective pixels.

In accordance with another preferred embodiment, liquid crystal particles are formed within a carrier. The liquid crystal layer is prepared in the form of an emulsion containing the liquid crystal particles dispersed in the carrier. The dielectric constant of the liquid crystal layer is controlled by adjusting the percentage of a copolymer of vinylidenefluoride and trifluoroethylene included in the carrier.

First, a copolymer of vinylidenefluoride and trifluoroethylene is dissolved in an alcohol solution including acetone by agitating and heating at the same time. The concentration of the copolymer is 1 to 15%. The solution is then mixed with a nematic liquid crystal material distributed as BL001 (Trademark) by Merck Corp. The concentration of the liquid crystal is 1 to 20%. The ratio of the copolymer to the liquid crystal is selected to be 8:2 to 4:6 in general. The mixture is coated on a glass substrate carrying an ITO electrode arrangement by casting. The substrate is heated to remove the solvent by vaporization at 30° to 50° C. The thickness of the liquid crystal layer is 5 to 15 micrometers. The glass substrate is joined to a counterpart glass substrate carrying a counterpart ITO electrode arrangement to form a liquid crystal panel. In accordance with experiments, the transparency of the panel was measured to be 3%, when no electric field was applied, in the case that the ratio of the copolymer to the liquid crystal was selected to be 6:4. The transparency of the same panel was measured to be 82%, when an appropriate electric field was applied. This ratio of 6:4 was the optimum ratio of the copolymer to the liquid crystal in the experiments. The voltage sustaining ability was 97 to 99%. The liquid crystal layer was separated from the panel and exposed to vacuum in order to vaporize the liquid crystal material. The remaining polymer appeared containing pores whose diameters were measured to be 1 to 2 micrometer.

Figure 5:
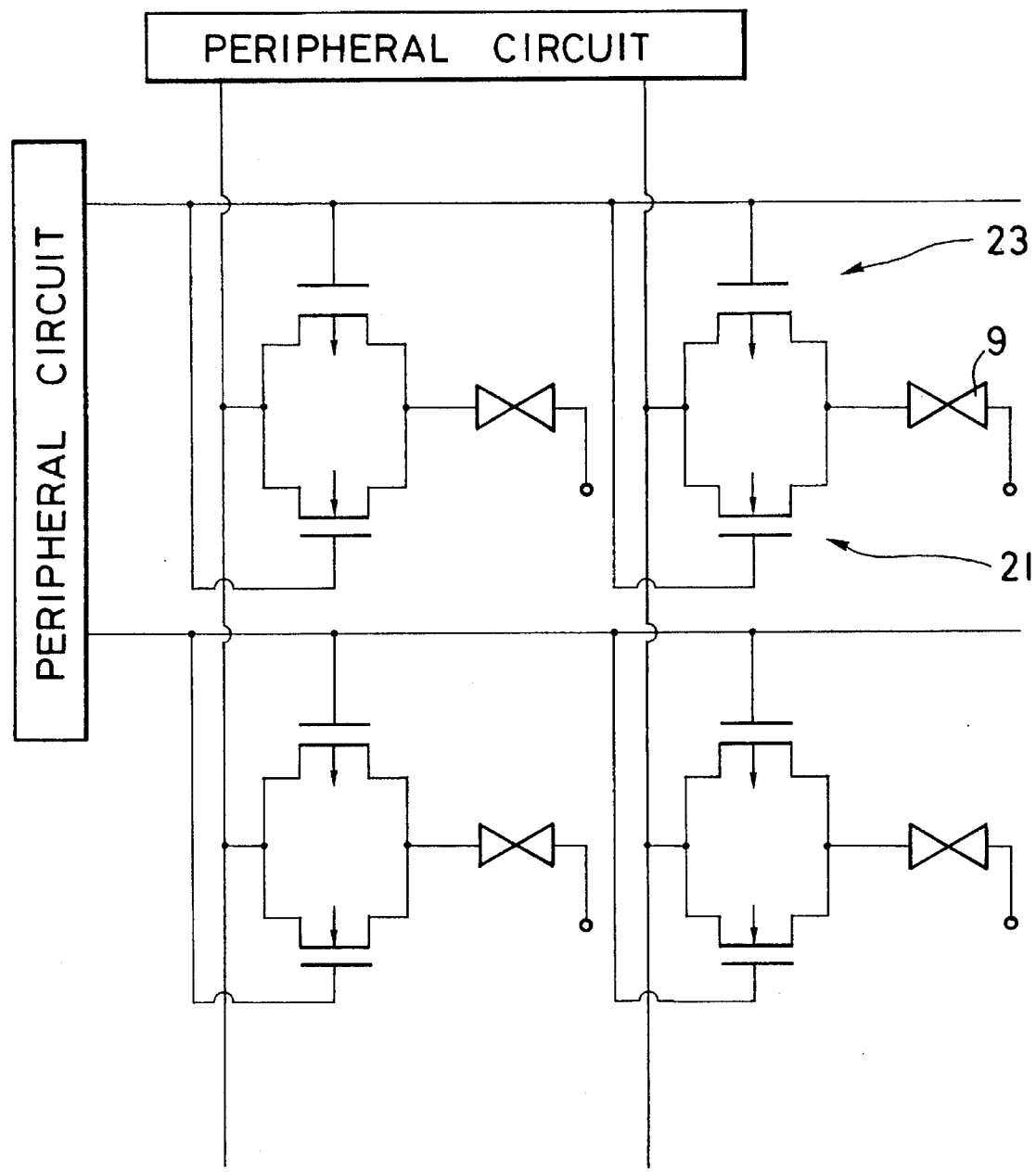
FIG. 5 is an equivalent circuit of another electro-optical liquid crystal device in accordance with the present invention.

Next, the liquid crystal layer was formed between a pair of glass substrates. The substrates are provided with complementary FETs and necessary interconnection wiring as illustrated in FIG. 5. The complementary FETs were pairs of TFTs, each pair of which comprises a silicon transistor 21 having an n-type channel below its gate and a silicon transistor 23 having a p-type channel below its gate. The dielectric constant of the liquid crystal layer 9 in this case was 10. With this panel, clear display was obtained without providing particular capacitances. Images were projected on a wall through the liquid crystal panel by means of a 300 W metal halide lamp. The contrast ratio in this case was 120:1. The number of grades was 16.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. An active matrix type electro-optical device comprising:

a pair of substrates;

an electro-optical modulating layer disposed between said substrates and comprising a liquid crystal material dispersed in a carrier; and an electrode arrangement formed on inside surfaces of said substrates in order to apply an electric field to said electro-optical modulating layer whereby said electro-optical modulating layer is placed in either a light transparent or a light scattering condition depending upon application of the electric field thereacross, wherein said carrier contains a ferroelectric material having a dielectric constant not less than 5, and the ferroelectric material is selected among from the group consisting of polyvinylidenefluoride and a copolymer of vinylidenefluoride and trifluoroethylene.

2. The electro-optical device as claimed in claim 1 wherein said liquid crystal material is encapsulated by an encapsulating material.

3. The electro-optical device as claimed in claim 2 wherein said liquid crystal material is encapsulated by coacervation.

4. The electro-optical device as claimed in claim 2 wherein said encapsulating material comprises a polymer.

5. The electro-optical device as claimed in claim 4 wherein said polymer is selected from the group consisting of gelatin or arbic rubber.

6. The electro-optical device as claimed in claim 2 wherein said liquid crystal material is in the form of capsules of which average diameter is 3 to 7 micrometers.

7. The electro-optical device as claimed in claim 1 wherein said dielectric material is a high polymer.

8. The electro-optical device as claimed in claim 7 wherein said high polymer comprises fluorine.

9. The electro-optical device as claimed in claim 8 wherein said high polymer is selected among from the group consisting of polyvinylidenefluoride and a copolymer of vinylidenefluoride and trifluoroethylene.

10. The electro-optical device as claimed in claim 1 wherein said liquid crystal material has anisotropy of refractive index.

11. An active matrix type electro-optical device comprising:

a pair of substrates;

an electro-optical modulating layer disposed between said substrates and comprising a liquid crystal material dispersed in a carrier; and a transparent electrode arrangement formed on inside surfaces of said substrates in order to apply an electric field to said electro-optical modulating layer whereby said electro-optical modulating layer is placed in either a light scattering or a light transparent condition depending upon application of the electric field thereacross, wherein said carrier contains a ferroelectric material selected from the group consisting of polyvinylidenefluoride and a copolymer of vinylidenefluoride and trifluoroethylene.

12. The electro-optical device as claimed in claim 11 wherein said ferroelectric material is a high polymer.

13. The electro-optical device as claimed in claim 12 wherein said high polymer comprises fluorine.

14. The electro-optical device as claimed in claim 13 wherein said high polymer is selected among from the group consisting of polyvinylidenefluoride, and a copolymer of vinylidenefluoride and trifluoroethylene.

15. The electro-optical device as claimed in claim 11 wherein said liquid crystal material has anisotropy of refractive index.

16. The device of claim 11 wherein said liquid crystal material is encapsulated by an encapsulating material.

17. The device of claim 11 wherein said encapsulating material comprises a polymer.

18. The device of claim 11 wherein said ferroelectric material has a dielectric constant not less than 5.

19. An active matrix type electro-optical device comprising:

a pair of substrates;

an electro-optical modulating layer disposed between said substrates and comprising a number of particles of a liquid crystal material dispersed in a carrier which includes a ferroelectric material selected among from the group consisting of polyvinylidenefluoride, and a copolymer of vinylidene and trifluoroethylene; and an electrode arrangement formed on inside surfaces of said substrates in order to apply an electric field to said electro-optical modulating layer;

whereby said electro-optical modulating layer is placed in either a light transparent or a light scattering condition depending upon application of the electric field thereacross.

20. An active matrix type electro-optical device comprising:

a pair of substrates;

an electro-optical modulating layer disposed between said substrates and comprising a liquid crystal material mixed with a carrier which includes a ferroelectric material having a high dielectric constant selected among from the group consisting of polyvinylidenefluoride, and a copolymer of vinylidene and trifluoroethylene; and a transparent electrode arrangement formed on inside surfaces of said substrates in order to apply an electric field to said electro-optical modulating layer;

whereby said electro-optical modulating layer is placed in either a light transparent or a light scattering condition depending upon application of the electric field thereacross.

21. The device of claims 1, 11, 19, 20 or 18 wherein said carrier is a resin.

22. An active matrix type electro-optical device comprising;

a pair of substrates;

an electro-optical modulating layer disposed between said substrates and comprising a liquid crystal material dispersed in a carrier;

an electrode arrangement formed on inside surfaces of said substrates to apply an electric field across said electro-optical modulating layer in order to operate said modulating layer in light scattering and light transparent condition;

wherein said carder material contains a ferroelectric material comprising an organic copolymer of vinylidenefluoride with at least one organic material.

23. The electro-optical device as claimed in claims 1, 11, 19, or 22 where said electrode arrangement includes a plurality of picture elements and where said device includes at least one switching element for each of said picture elements so that said electric field can be selectively applied to the picture elements.

24. An electro-optical device comprising:

an electro-optical modulating layer comprising a liquid crystal material dispersed in an organic ferroelectric material; and an electrode arrangement located adjacent to said electro-optical modulating layer;

wherein said organic ferroelectric material comprises an organic copolymer which is a copolymer of vinylidenefluoride and trifluoroethylene.

25. The electro-optical device as claimed in claim 24 wherein said organic copolymer is a copolymer of vinylidenefluoride and trifluoroethylene.

26. An electro-optical device comprising:

an electro-optical modulating layer comprising a liquid crystal material dispersed in an organic ferroelectric material; and an electrode arrangement located adjacent to said electro-optical modulating layer;

wherein said organic ferroelectric material comprises an organic copolymer of vinylidenefluoride with at least one organic material.

27. An active matrix type electro-optical device comprising:

an electro-optical modulating layer comprising a liquid crystal material dispersed in an organic ferroelectric material; and an electrode arrangement located adjacent to said electro-optical modulating layer;

wherein said organic ferroelectric material comprises an organic copolymer.

* * * * *